(12) United States Patent
Moshchuk et al.

(10) Patent No.: US 8,099,214 B2
(45) Date of Patent: Jan. 17, 2012

(54) PATH PLANNING FOR AUTONOMOUS PARKING

(75) Inventors: Nikolai K. Moshchuk, Grosse Pointe, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 531 days.

(21) Appl. No.: 12/367,778

(22) Filed: Feb. 9, 2009

(65) Prior Publication Data

US 2010/0204866 A1    Aug. 12, 2010

(51) Int. Cl.
*G06F 19/00* (2011.01)
(52) U.S. Cl. .............. 701/41; 701/23; 180/204
(58) Field of Classification Search .......... 701/41, 701/42, 23; 180/204

See application file for complete search history.

(56) References Cited

U.S. PATENT DOCUMENTS

| 7,469,765 B2* | 12/2008 | Spannheimer et al. ....... 180/204 |
| 2008/0125939 A1* | 5/2008 | Luke ............... 701/41 |
| 2010/0286872 A1* | 11/2010 | Endo et al. ............. 701/41 |

* cited by examiner

*Primary Examiner* — Kevin Hurley (57) ABSTRACT

A method is provided for determining a vehicle path for autonomously parallel parking a vehicle in a space between a first object and a second object. A distance is remotely sensed between the first object and the second object. A determination is made whether the distance is sufficient to parallel park the vehicle between. A first position to initiate a parallel parking maneuver is determined. A second position within the available parking space corresponding to an end position of the vehicle path is determined. A first arc shaped trajectory of travel is determined between the first position and an intermediate position, and a second arc shaped trajectory of travel is determined between the second position and the intermediate position. The first arc shaped trajectory is complementary to the second arc shaped trajectory for forming a clothoid which provides a smoothed rearward steering maneuver between the first position to the second position.

18 Claims, 6 Drawing Sheets

PATH PLANNING FOR AUTONOMOUS PARKING

BACKGROUND OF INVENTION

An embodiment relates generally to autonomous parking a vehicle.

Parallel parking a vehicle between two vehicles is often a difficult task for a driver. Semi-autonomous parking systems are vehicle based systems designed to aid the driver in performing difficult parking maneuvers such as parallel parking. Such systems either guide the driver in steering the vehicle through its intended trajectory path or increase/decrease power steering efforts when the driver of the vehicle has deviated from the intended trajectory path. In such systems, the driver is required to control the steering efforts or make some adjustments to the steering wheel.

SUMMARY OF INVENTION

An advantage of an embodiment of the invention provides for an autonomous parallel parking system that smooths the profile of the parking trajectory based on arc circles and clothoids. The autonomous parallel parking system provides path planning for either a one cycle steering maneuver or a two cycle steering maneuver.

An embodiment contemplates a method of determining a vehicle path for autonomously parallel parking a vehicle in a space between a first object and a second object in response to an available parking distance between the first object and second object. A distance is remotely sensed between the first object and the second object. A determination is made whether the distance is sufficient to parallel park the vehicle between the first object and the second object based on a threshold. A first position to initiate a parallel parking maneuver is determined. A second position within the available parking space corresponding to an end position of the vehicle path is determined. A first arc shaped trajectory of travel is determined between the first position and an intermediate position, and a second arc shaped trajectory of travel is determined between the second position and the intermediate position. The first arc shaped trajectory is complementary to the second arc shaped trajectory for forming a clothoid which provides a smoothed rearward steering maneuver between the first position to the second position. A steering actuator is controlled to follow the determined vehicle path.

An embodiment contemplates an autonomous parking system for parallel parking a vehicle between a first object and a second object. A sensing device for detecting objects proximate to the driven vehicle, the sensing device provides signals configured for determining a space between the first object and the second object. A controller receives signals identifying the space between the first object and the second object. The controller autonomously controls steering of the vehicle for parallel parking the driven vehicle. The controller determines a first arc shaped trajectory of travel between a first position and an intermediate position. The first arc shaped trajectory is cooperatively formed from at least one clothoid and an arc circle. The controller determines a second arc shaped trajectory of travel between a second position and the intermediate position. The second arc shaped trajectory is cooperatively formed from at least one clothoid and an arc circle. The first arc shaped trajectory is complementary to the second arc shaped trajectory at the intermediate position for forming a smoothed transition rearward steering maneuver from the first position to the second position. The controller utilizes the smoothed transition rearward steering maneuver for autonomously parallel parking the vehicle driven vehicle.

DETAILED DESCRIPTION

Figure 1:
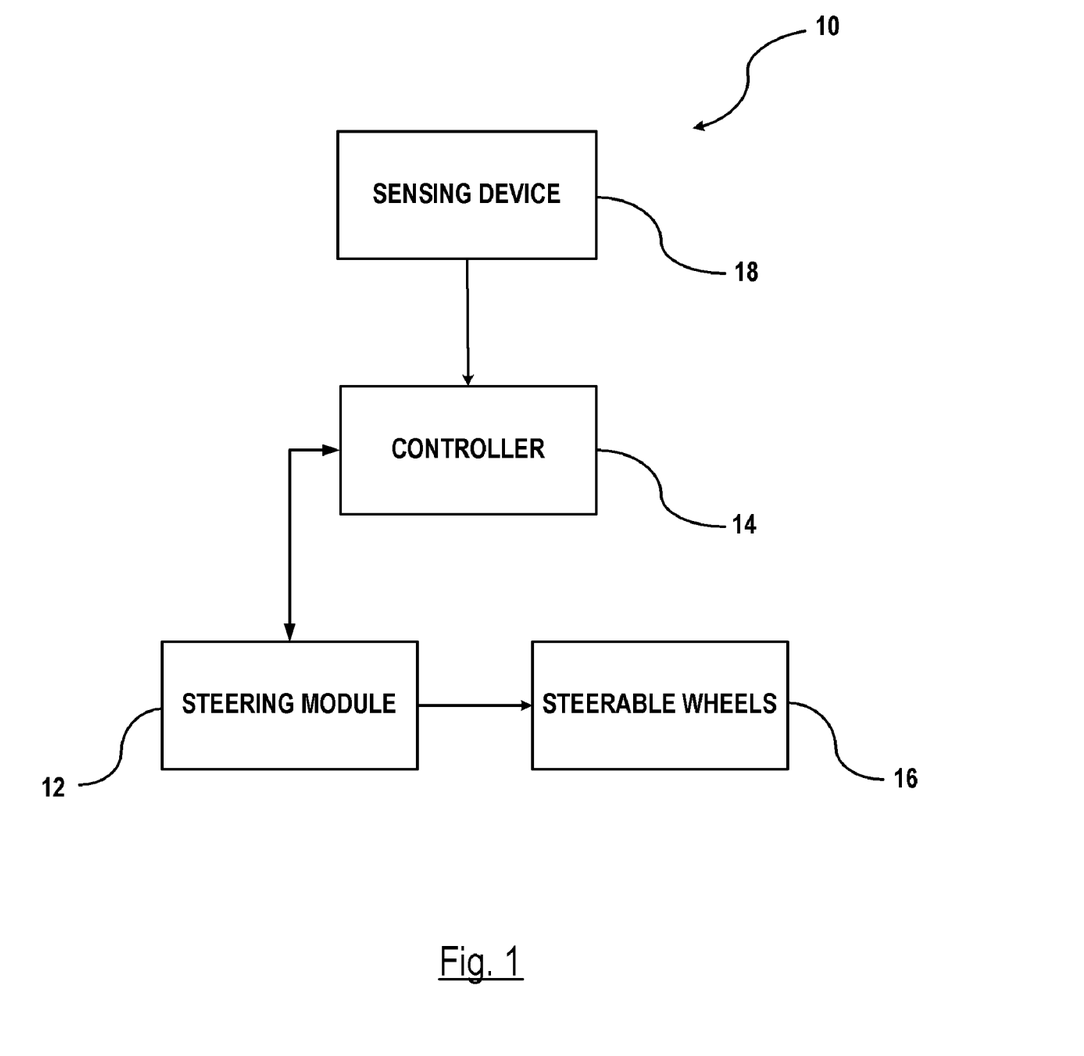
FIG. 1 is a block diagram illustrating an autonomous parallel parking system according to an embodiment.

There is shown in FIG. 1 an embodiment of an autonomous steering system 10 for parallel parking a vehicle. The autonomous steering system 10 includes a steering module 12 and a controller 14 for controlling steerable wheels 16 of the vehicle. The steering module 12 may be an electronic module or similar device that is capable of pivoting the steerable wheels 16 without a driver's steering demand via a steering wheel of the vehicle. The controller 14 provides control input signals to the steering module 12, such as a conventional electronic power steering module, for controlling the pivoting of the steerable wheels during a parking maneuver. The controller 14 may be separate from the steering module 12 or may be integrated within the steering module 12 as a single unit.

The autonomous steering system 10 further includes a sensing device 18 for detecting objects proximate to the driven vehicle. The sensing device 18 detects the presence and non-presence of objects laterally from the vehicle for determining an available parking space between a first object and a second object. The sensing device 18 may include a radar-based sensing device, an ultrasonic-based sensing device, an imaging-based sensing device, or similar device capable of providing a signal characterizing the available space between the objects. The sensing device 18 is in communication with the controller 14 for providing signals to the controller 14. The sensing device 18 may be capable of determining the distance between the respective objects and communicating the determined distance to the controller 14, or the sensing device 18 may provide signals to the controller 14 to be used by the controller 14 to determine the distance of the spacing between the objects.

In response to the determined spacing between the first and second objects, controller 14 determines whether to apply a one cycle parking maneuver or a two cycle parking maneuver. The one cycle parking maneuver includes a single cycle steering strategy where the steerable wheels are pivoted in a first direction and then a counter direction for steering the vehicle to a parked position. No gear change is required in a one cycle parking maneuver.

The two cycle parking maneuver includes a two cycle steering strategy where the steerable wheels are pivoted in a first direction and then a counter direction (i.e., first steering maneuver). Thereafter, a gear change is performed (i.e., rearward to drive position) and a second steering maneuver is performed for steering the vehicle forward to a final park position. Determining whether the vehicle can be successfully parallel parked utilizing the two cycle steering strategy is modeled on a condition of whether the vehicle parked in the available parking space can leave the parking spot utilizing two steering maneuvers. That is, if the vehicle can leave the parking space utilizing only two steering maneuvers, then the vehicle can be parallel parked in the parking space utilizing only two steering maneuvers. A first steering maneuver includes the vehicle moving backward in the available parking space at a respective turning angle where a respective rear corner of the vehicle reaches a respective boundary (i.e., front of the first object). A second steering maneuver includes the vehicle moving forward where a respective front corner of the vehicle reaches a respective rear boundary of the second object (i.e., rear corner of the second object).

A routine for determining whether a vehicle can be parked in an available parking space utilizing either a single cycle steering strategy or a two cycle steering strategy is described in a application having a Ser. No. 12/107,130, filed on Apr. 22, 2008, which is incorporated by reference in its entirety. The routine determines a first minimum length for parking the vehicle using a single parallel parking maneuver and a second minimum length for parking the vehicle using a two cycle parallel parking maneuver based on the available parking space between the first object and second object.

Figure 2:
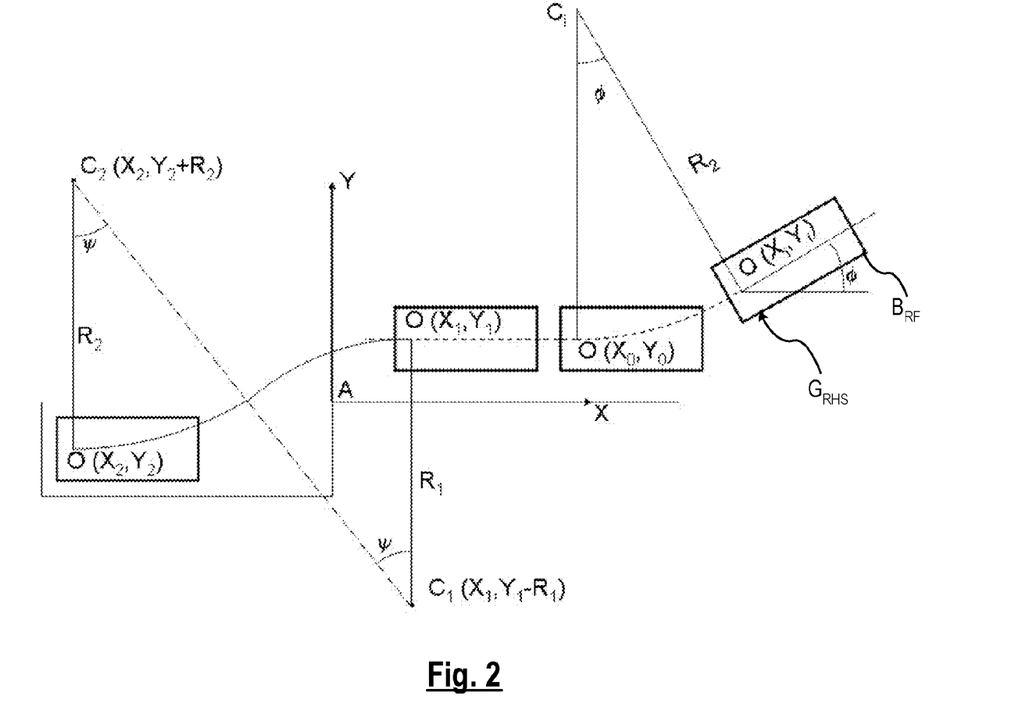
FIG. 2 is a geometric schematic illustrating vehicle path planning for applying a one cycle steering strategy maneuver according to an embodiment.
Figure 3:
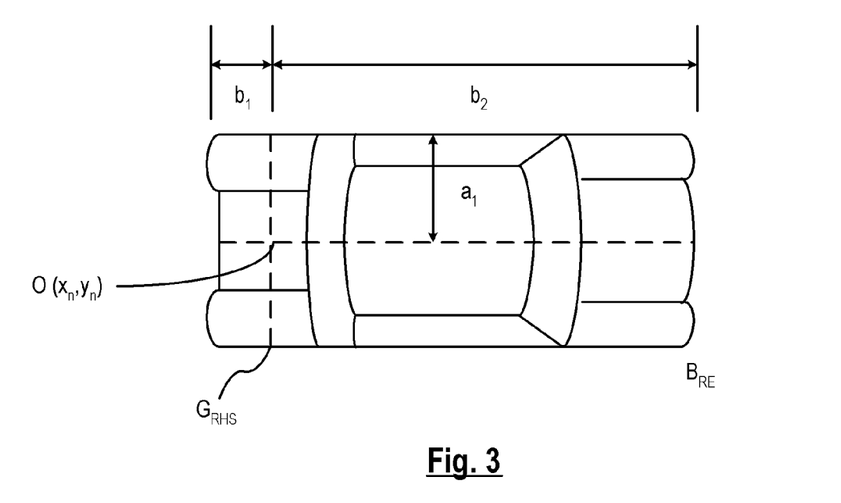
FIG. 3 is a geometric schematic of a vehicle according to an embodiment.

For a one cycle parking strategy, as shown in FIG. 2, the available parking space is bordered by two objects, specifically, two in-line parked vehicles with or without a curb. FIG. 3 illustrates the vehicle dimensions and vehicle region designations that will be used in conjunction with the each of the figures shown herein to explain the parallel parking strategies. Referring again to FIG. 2, the available parking space with the curb has a respective length and width. The coordinate system (YAX) is used to show the relative position of the driven vehicle to the available parking space with the outer edge of object 2 being the origin (A). The coordinate system is oriented relative to curb. The x-axis of the coordinate system is parallel to the curb. The relative position of the driven vehicle to the available parking space is determined by the (1) relative angle of the vehicle centerline to the axis AX and (2) the vehicle position using the midpoint of the rear axle relative to (YAX) coordinate system.

Depending on the parking slot dimensions and orientation, the target position of the vehicle $O(x_2, y_2)$ can be defined. The objective is to bring the vehicle from its initial position $O(x_i, y_i)$ to the final position $O(x_2, y_2)$ To park the vehicle using the one cycle parking strategy, three steps are involved: (1) the vehicle is aligned using a shortest distance traveled (e.g. $O(x_i, y_i)$ to $O(x_0, y_0)$), (2) the vehicle is moved along the x-axis as far as possible until the location of the parallel parking maneuver is initiated (e.g. $O(x_0, y_0)$ to $O(x_1, y_1)$), and (3) parallel parking is performed from $O(x_1, y_1)$ to $O(x_2, y_2)$).

During the initial stage (i.e., step (1)) of the one cycle parking maneuver, depending on the location of the vehicle relative to the object, the vehicle is steered at a maximum possible angle until a heading (yaw) angle is brought to zero (i.e., $O(x_i, y_i)$ to $O(x_0, y_0)$). This gives the shortest possible arc length traversed by the midpoint of the rear axis of the vehicle. The location $O(x_0, y_0)$ as shown in FIG. 2 is the coordinate where the vehicle has a heading angle of zero. This coordinate is represented by the following:

$$x_0 = x_i - R_1 \sin \phi,$$

$$y_0 = y_i + R_1(1 - \cos \phi) \text{ if } \phi \leq 0 \quad (1)$$

or $$x_0 = x_i - R_2 \sin \phi,$$

$$y_0 = y_i - R_2(1 - \cos \phi) \text{ If } \phi > 0 \quad (2)$$

where $R_1$ is the radial distance from an initial turn center $C_i$ of an initial arc radius from $O(x_i, y_i)$ to $O(x_0, y_0)$ which is representative of the midpoint of the rear axle of the vehicle, $R_2$ is the radial distance from a first turn center $C_1$ of a first arc radius initiating at $O(x_i, y_i)$ to the midpoint of the rear axle of the vehicle, and $\phi$ angle of the first arc radius of the first turn center $C_1$. This strategy can be modified if $x_0 - x_1$ is sufficiently large to accommodate smallest and smoothest possible road wheel angle profile.

In the second step (e.g., $O(x_0, y_0)$ to $O(x_1, y_1)$) the vehicle is moved along the x-axis with a road wheel angle of zero until the midpoint of the rear axle reaches a position $O(x_1, y_1)$. At position $O(x_1, y_1)$ the steering maneuver is initiated. The distance that the vehicle travels in a rearward direction along the x-axis is equal to $x_0 - x_1$.

In the third step (e.g., $O((x_1, y_1)$ to $O(x_2, y_2))$ parallel parking is performed to park the vehicle at the final position. The shortest path of travel to park the vehicle from position $O(x_1, y_1)$ to position $O(x_2, y_2)$ consists of two arcs. The lateral distance in the (YAX) coordinate system between position $O(x_1, y_1)$ and position $O(x_2, y_2)$ is represented by the formula:

$$H = y_1 - y_2 > 0 \quad (3)$$

The angle of rotation $\psi$, as shown in FIG. 1, is a function of H in the following geometric relation:

$$H = (R_1 + R_2)(1 - \cos\psi), \quad (4)$$

$$\psi = \arccos\left(1 - \frac{H}{R_1 + R_2}\right).$$

The longitudinal distance that the vehicle moves along the X-axis required for parallel parking is represented by the formula:

$$L \equiv x_1 - x_2 \quad (5)$$

therefore, $$L = (R_1 + R_2)\sqrt{1 - \left(1 - \frac{H}{R_1 + R_2}\right)^2}. \quad (6)$$

Factors that must be taken into consideration when parking the vehicle includes the clearance between the vehicle and object 2 forward of the vehicle. Conditions for not interfering with the front object are as follows:

$$(R_2 + a_1)^2 + b_2^2 < x_2^2 + (y_2 + R_2)^2 \quad (7)$$

$$x_1 > 0 \text{ AND } (R_1 - a_1)^2 > x_1^2 + (y_1 - R_1)^2. \quad (8)$$

A portion of the vehicle that must clear the front object is the right front corner of the vehicle ($B_{RF}$) which must avoid hitting the front object as the vehicle travels rearward into the available parking space. An alternative condition may include $x_1<0$ where the entire right hand side of the vehicle, and particular point $G_{RHS}$, does not hit the front object.

Figure 4:
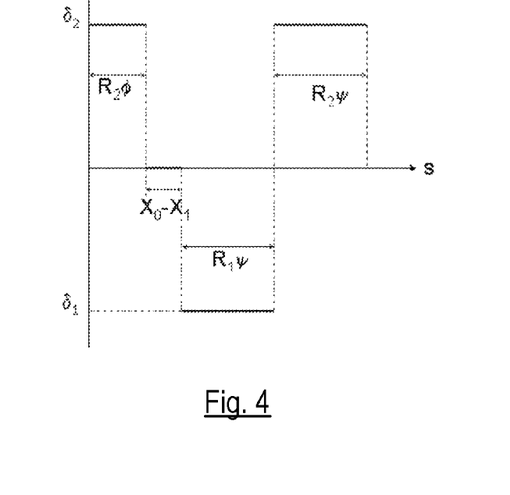
FIG. 4 is a graph of a road wheel angle as a function of distance traveled by a vehicle according to an embodiment.
Figure 5:
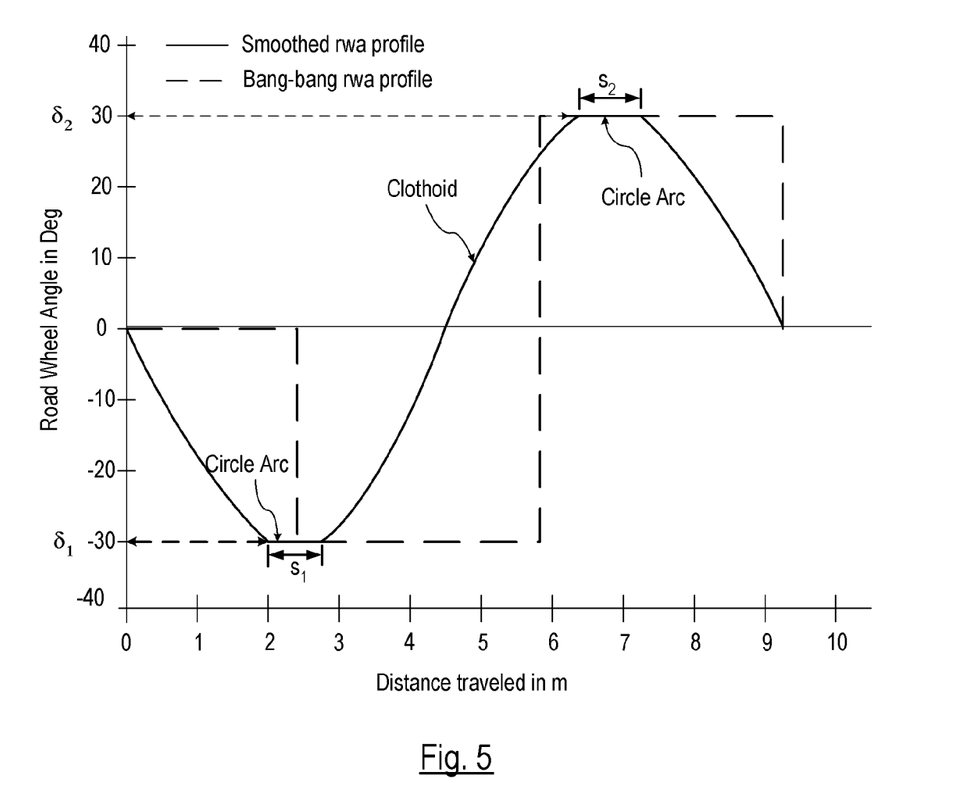
FIG. 5 is a graph of a smoothed road wheel angle profile according to an embodiment.

A total distance traversed by the midpoint of the rear axle from $O(x_1, y_1)$ to $O(x_2, y_2)$ is equal to $(R_1+R_2)\psi$. FIG. 4 illustrates the road wheel angle as a function of distance traveled by the rear axle midpoint. Smoothing the road wheel angle (RWA) profile is needed since actuators such as an EPS or/and AFS cannot exactly follow a bang-bang command as shown in FIG. 4 due to the actuator limitations; however, smoothing of the RWA results in a longer distance traveled. Different functions can be used to smooth the transition between zero and maximum road wheel angle. One possible function makes the tangent of the road wheel angle a linear function of arc length (with some slope $\xi$), as shown in FIG. 5. That is, the tangent of the road wheel angle is a piecewise linear function of arc length with the slope $+/-\xi_1$. In this embodiment, the heading angle (yaw angle) changes quadratically with the arc length, and the trajectory is a clothoid. The durations of the maximums steering, $s_1$ and $s_2$, are coordinated so that the net change of the yaw angle is zero. This relationship is represented by the following equation:

$$s_2 = \frac{\tan\delta_1}{\tan\delta_2} s_1 + \frac{\tan^2\delta_1 - \tan^2\delta_2}{\xi \tan\delta_2} \quad (9)$$

In changing $s_1$ and integrating equations of motion numerically, the final position of the midpoint of the rear axle $(x_2, y_2)$ can be obtained as a function of $s_1$. In determining $y_2$ from the parking spot detection, one can determine $s_1$ from this relationship and store this relationship as a table lookup (see FIG. 5 where $s_1$ and $s_2$ are durations of full steer).

Figure 6:
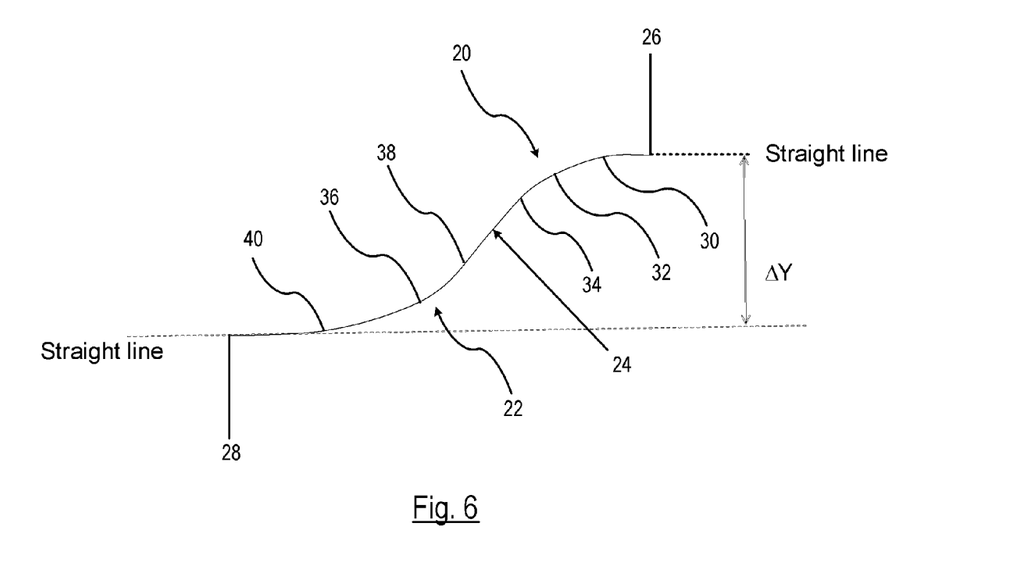
FIG. 6 is a graphical representation of trajectory of the vehicle along a smoothed path profile according to an embodiment.

FIG. 6 illustrates a smoothed trajectory profile of the midpoint of the rear axle of the vehicle as it transitions through into the parking space. As shown in FIG. 6, the trajectory is formed from a plurality of circle arcs and clothoids. The trajectory as a whole can be viewed as a first arc shaped trajectory 20 and a second arc shaped trajectory 22 that inversely mirror one another. The first arc shaped trajectory is complementary to the second arc shaped trajectory at an intermediate position 24 for forming a smoothed rearward steering maneuver from the first position where the parallel parking maneuver is initiated to a second position where the vehicle is either parked or the gears of the transmission are changed to a forward drive position.

In FIG. 6, a first position 26 represents the starting position of the rearward parallel parking maneuver. A second position 28 represents an ending position for the rearward parallel parking maneuver. It should be understood that additional maneuvers may be added which include forward driving maneuvers within the available parking space to straighten the vehicle or even park the vehicle between two objects. The first arc shaped trajectory 20 includes an initial segment 30 (e.g., clothoid), a first segment 32 (e.g. circle arc) and a second segment 34 (e.g., clothoid). The second arc shaped trajectory 22 includes a first segment 36 (e.g. circle arc), a second segment 38 (e.g., clothoid), and an ending segment 40 (e.g., clothoid). The first segment 32 of the first arc shaped trajectory 20 and the first segment 36 of the second arc shaped trajectory 22 cooperatively form a clothoid that extends between the first arc-shaped trajectory 20 and the second arc-shaped trajectory 24. The cooperative joining of each of the segments formed from arc circles and clothoids provide a smoothed transition into the available parking space.

Figure 7:
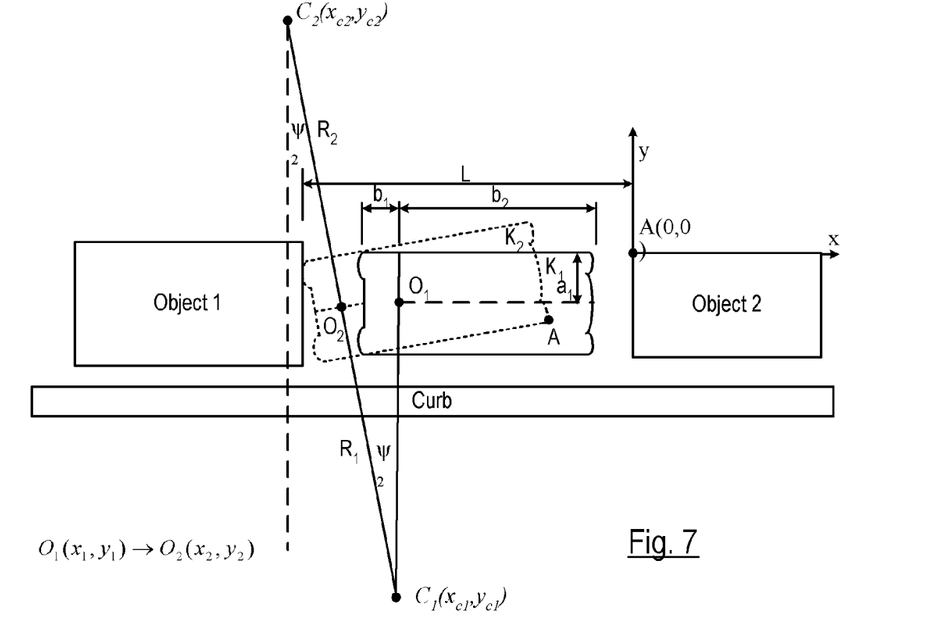
FIGS. 7-8 is a geometric schematic illustrating vehicle path planning for applying a two cycle steering strategy maneuver according to an embodiment.
Figure 8:
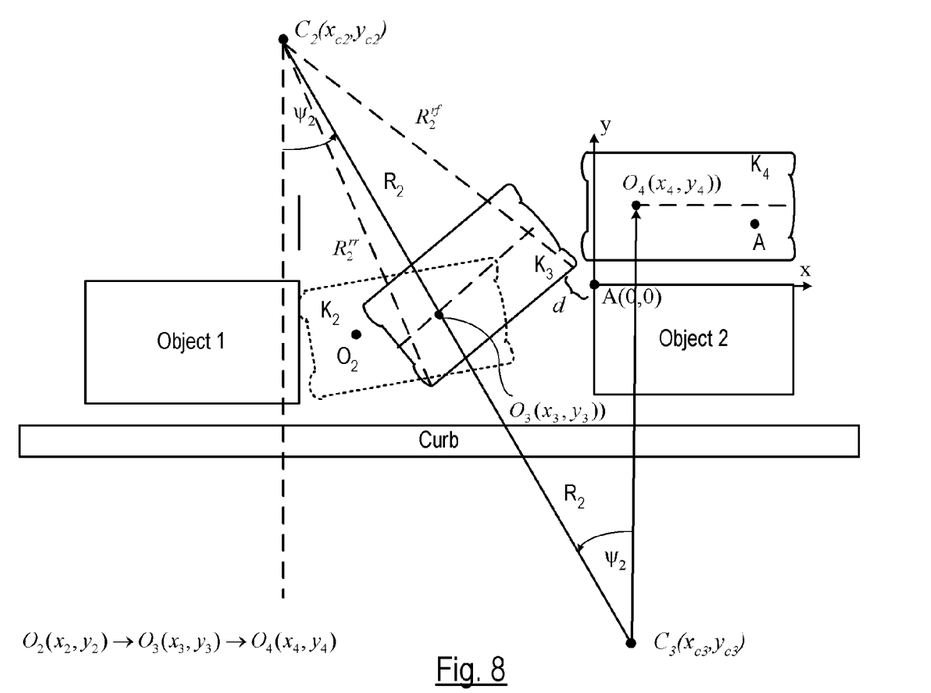
Figure 9:
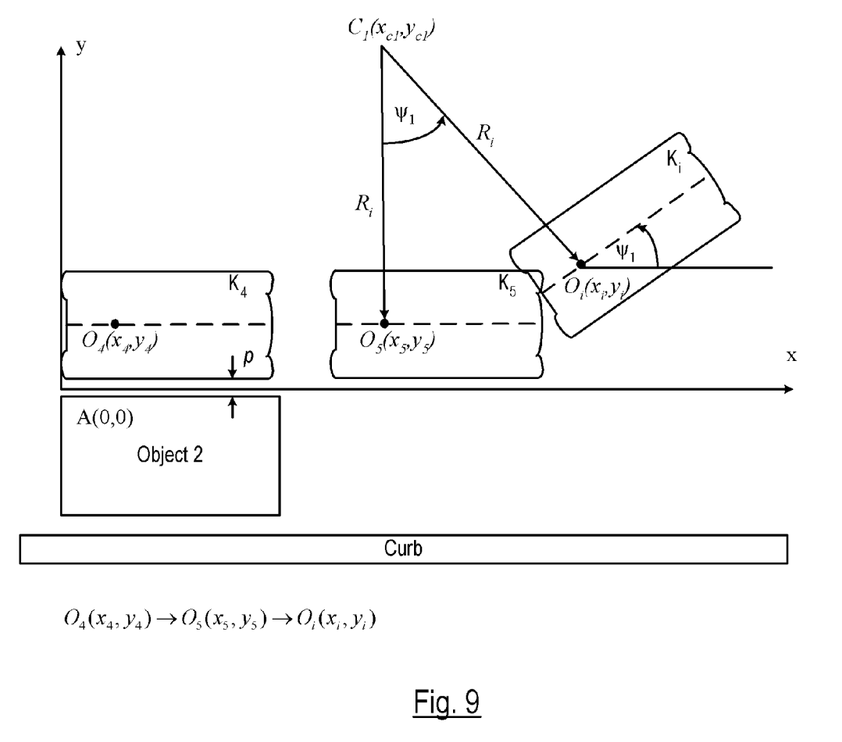
FIG. 9 is a geometric schematic illustrating initial vehicle positioning relative to an available parking space according to an embodiment.

The two cycle parking maneuver for the bang-bang control is illustrated in FIGS. 7-9. The two cycle parking maneuver can best be explained by describing the path planning in reverse order (i.e., from the destination to the initial position). In FIG. 7, $K_1=\{O_1, \psi=0\}$ represents the final configuration of the vehicle inside the parking spot, where $O_1(x_1, y_1)$ is the global coordinates of the vehicle and $\psi_1$ is the vehicle yaw angle. The coordinate system has a configuration relative to object 2 with its origin located at the left rear corner of object 2. For simplicity purposes, assume the final yaw angle is zero. Let the vehicle move from configuration $K_1$ into $K_2$ where $K_2=\{O_2, \psi_2\}$ with a constant steer angle $\delta_1$ such that the path curvature has a constant radius $R_1=R_1(\delta_1)$. The new position is represented by coordinates $(x_2, y_2)$ which can be determined by the following equations:

$$x_2 = x_{C_1} - R_1 \sin\psi_2$$

$$y_2 = y_{C_1} + R_1(1-\cos\psi_2). \quad (10)$$

The coordinates of the turn center $C_1$ is represented by coordinates $(x_{C_1}, y_{C_1})$ which can be determined based on the following equations:

$$x_{C_1} = x_1$$

$$y_{C_1} = y_1 - R_1. \quad (11)$$

The turn angle $\psi_2$ may be determined by the following geometric condition:

$$(R_1+a_1)\sin\psi_2 + b_1 \cos\psi_2 = L + x_1 \quad (12)$$

which represents the distance from $O_1$ to the left boundary of the parking spot (note that $x_1<0$ as shown in FIG. 7.) Utilizing trigonometric calculations, equation (12) is as follows:

$$\psi_2 = \arcsin\frac{L+x_1}{\sqrt{(R_1+a_1)^2+b_1^2}} - \arcsin\frac{b_1}{\sqrt{(R_1+a_1)^2+b_1^2}} \quad (13)$$

FIG. 8 illustrates a next stage of the path planning, from position $K_2\{O_2, \psi_2\}$ to position $K_3\{O_3, \psi_3\}$. The vehicle makes a turn while maintaining a constant radius $R_2$ where $R_2=R_2(\delta_2)$. The corresponding turn center $C_2$ for the turn has the following coordinates:

$$x_{C_2} = x_{C_1} - (R_1+R_2)\sin\psi_2$$

$$y_{C_2} = y_{C_1} + (R_1+R_2)\cos\psi_2. \quad (14)$$

Position $K_3$ is determined based on the condition that the right front corner of the vehicle is at the respective minimal distance d from the left rear corner of the object 2. This respective condition can be represented by the following equation:

$$C_2A = R_2^{rf} + d \quad (15)$$

where $C_2A$ is the distance from the turn center to the origin of the coordinate system (XAY) located at the left rear corner of object 2, and $R_2^{rf}$ is the turning radius of the right front corner of the vehicle. Using Pythagorean's theorem, the respective distances may be solved for:

$$C_2A = \sqrt{x_{C_2}^2 + y_{C_2}^2} \quad (16)$$

$$R_2^{rf} = \sqrt{(R_2+a_1)^2 + b_2^2}. \quad (17)$$

The vehicle coordinates when the at position $K_3$ are determined based on the following equations:

$$x_3 = x_{C_2} + R_2 \sin\psi_3$$

$$y_3 = y_{C_2} - R_2 \cos\psi_3. \quad (18)$$

Since $R_2^{rf}$ is the maximum radius connecting the turn center $C_2$ and an arbitrary point of the vehicle boundary, d>0 is a sufficient condition for the vehicle to leave the parking spot without collision with object 2. Based on the minimum spot length $L_{min}$ condition, the final position of the vehicle inside the parking spot is $$K_1 = \{O_1(-b_2, -a_1); 0\} \tag{19}$$

If vehicle position $K_3$ is the position when the vehicle is at the minimum distance to object 2 (see FIG. 8), this represents a turning point for starting the right turn to bring the vehicle into position $K_4$ parallel to object 2. Position $K_4$ is represented by the following vehicle configuration:

$$K_4 = \{O_4(x_4, y_4); 0\}. \tag{20}$$

The turn center $C_3$ for the position $K_4$ has the following coordinates:

$$x_{C_3} = x_{C_2} + (R_2 + R_3)\sin\psi_3 = x_4$$

$$y_{C_3} = y_{C_2} - (R_2 + R_3)\cos\psi_3 = p + a_1 - R_3 \tag{21}$$

where p is the distance between the vehicle and object 2 when the vehicle and object 2 are parallel to one another. Therefore, a turn angle $\psi_3$ as shown in FIG. 8 may be represented as follows:

$$\psi_3 = \arccos\frac{y_{C_2} + R_3 - (p + a_1)}{R_2 + R_3} \tag{22}$$

and $$x_4 = x_{C_2} + \sqrt{(R_2 + R_3)^2 - (y_{C_2} + R_3 - p - 1)^2}$$

$$y_4 = p + a_1. \tag{23}$$

The above equation (23) determines the position from which the vehicle should start its entrance into the available parking space. Note that all quantities given by the above equations (1) through (23) can be calculated before executing the path-planning algorithm.

To perform path planning and park the vehicle in the available parking space, the algorithm assumes that the vehicle's starting position is position $K_4$ for initiating the two cycle parking maneuver. The path from $K_4$ to the target position $K_1$ is simply the backward path from $K_1$ to $K_4$. Therefore, the vehicle must be moved into position $K_4$. It should be understood that there are multiple ways of transitioning the vehicle from a position $K_i$ to the position $K_4$. FIG. 9 illustrates one of a plurality of methods for moving the vehicle from $K_i$ to position $K_4$. The first step is to set the following conditions:

$$R_3 = R_1 = R_{rhs}$$

$$R_2 = R_{lhs} \tag{24}$$

where $R_{rhs}$ is the minimal right turn radius and $R_{lhs}$ is the minimal left turn radius, respectively. Note that in general there are multiple ways of bringing the vehicle from its initial position $K_i$ into position $K_4$. As shown in FIG. 9, starting from $K_i$, the vehicle makes a turn in a rearward direction until the vehicle becomes parallel to object 2 represented as position $K_5$. The coordinate of the vehicle as represented by the position of the midpoint of the rear axle having the coordinate $O_5(x, y_5)$. Coordinate $O_5(x_5, y_5)$ with a corresponding arc length is determined by the following equations:

$$x_5 = x_i - R_i \sin\psi_i$$

$$y_5 = y_i - R_i(1 - \cos\psi_i)$$

$$\psi_5 = 0$$

$$\Delta s = R_i \psi_i. \tag{25}$$

The initial position $K_i$ can be arbitrary with some limits, but the turning radius must be such that at the end of the turn, the following condition must be satisfied:

$$y_5 = y_4 = p + a_1. \tag{26}$$

Moreover, there is also a constraint on x-coordinates such that $$x_5 \geq x_4. \tag{27}$$

Substituting equation (26) into equation (25), produces the following:

$$R_i = \frac{y_i - (p + a_1)}{1 - \cos\psi_i}. \tag{28}$$

A corresponding road steer angle $\delta$ can therefore be derived from Eq. (22) and (28):

$$\delta = \arctan\frac{w}{R_i}. \tag{29}$$

As stated earlier, the constraints shown in equations (26) and (27) place limitations on the initial positions from which it is possible to start the entire 2-cycle parking maneuver. By substituting the equation (25) into equation (27) and taking into account equation (28), the following result is derived:

$$\frac{x_i}{\alpha_i(\psi_i)} + \frac{y_i}{\beta_i(\psi_i)} \geq 1 \tag{30}$$

where $$\alpha_i(\psi_i) = x_4 - (p + a_1)\cot(\psi_i/2)$$

$$\beta_i(\psi_i) = -x_4 \tan(\psi_i/2) + p + a_1. \tag{31}$$

where $x_4$ is determined from equation (21).

Since a driver initiates the start of the two cycle parallel parking maneuver from the left side of object 2, the condition $R_i \geq R_{lhs}$ must be satisfied. Therefore, equation (28) also requires the following condition:

$$y_i \geq p + a_1 + 2R_{lhs}\sin^2\frac{\psi_i}{2} \equiv y_i^{min}(\psi_i) \tag{32}$$

Figure 10:
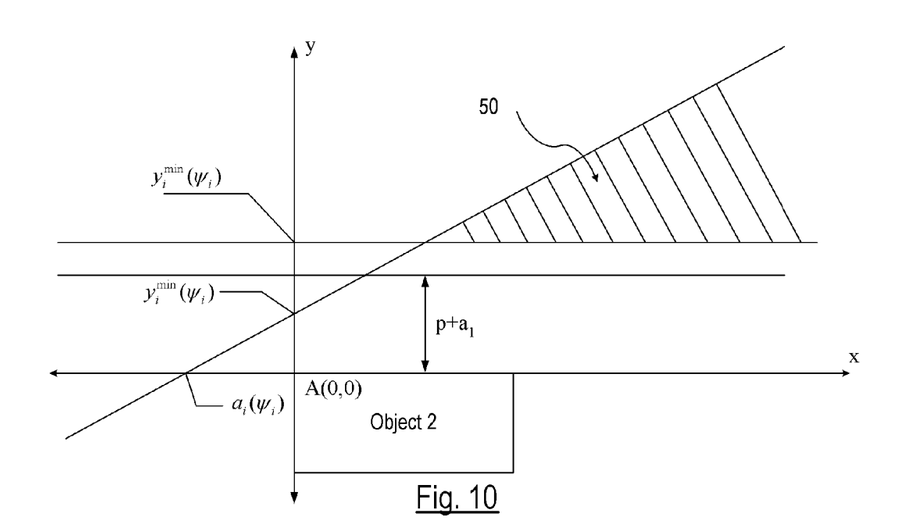
FIG. 10 is a diagram illustrating acceptable initial vehicle starting positions according to an embodiment.

The inequalities as shown in equation (30) and equation (32) geometrically restrict the initial position $K_i$ to the sector area shown generally at 50 in FIG. 10.

A second stage illustrates the vehicle moving from position $K_5$ to $K_4$. In the second stage, the vehicle simply moves backward with a zero steer angle until the vehicle reaches $O_4(x_4, y_4)$ position as shown in FIG. 9. The corresponding path of travel is a straight line in the x-direction. The traveled distance and the steer angle are represented by the following formulas:

$$\Delta s = x_5 - x_4$$

$$\delta = 0 \tag{33}$$

where $x_4$ and $x_5$ must be determined in advance from equations (23) and (25), respectively.

A third stage illustrates the vehicle moving from position $K_4$ to $K_3$. In the third stage, the vehicle makes a turn to move to position $K_3$ as shown in FIG. 8. The vehicle configuration at position $K_3$ is represented by $K_3=\{(x_3, y_3);\psi_3\}$. A corresponding arc length and road steer angle from position $K_4$ to $K_3$ is represented by the following:

$$\Delta s = R_3 \psi_3 \qquad (34)$$
$$\delta = -\arctan \frac{w}{R_3}$$

where $\psi_3$ and $R_3$ are determined by equation (22) and equation (24), respectively.

A fourth stage illustrates the vehicle moving from position $K_3$ to $K_2$. In the fourth stage, as shown in FIG. 8, the steer angle changes at the intermediate position $K_3$ from negative to positive. The vehicle continues its path of travel having a positive steer angle until a rear left corner reaches a minimal allowed distance to object 1. The corresponding arc length and steer angle for the vehicle transitioning from $K_3$ to $K_2$ are represented by the following:

$$\Delta s = R_2(\psi_3 - \psi_2) \qquad (35)$$
$$\delta = \arctan \frac{w}{R_2}$$

where $\psi_2$ and $R_2$ are determined from equation (4) and equation (24), respectively.

A fifth stage illustrates the vehicle moving from position $K_2$ to $K_1$. In the fifth stage, as shown in FIG. 7, the steer angle changes from positive to negative. The transmission gear is changed from a reverse gear position to drive gear position. The vehicle continues moving in a forward direction until the vehicle reaches position $K_1$. The corresponding arc length and steer angle for the vehicle moving from $K_2$ to $K_1$ are represented by the following:

$$\Delta s = R_1(\psi_2 - \psi_1), \psi_1 = 0 \qquad (36)$$
$$\delta = -\arctan \frac{w}{R_1}$$

where $\psi_2$ and $R_1$ are determined from equation (12) and equation (24), respectively.

An optional stage may be included to better position the vehicle within the available parking space between object 1 and object 2. The vehicle may be placed into the reverse gear position and the vehicle may be moved in a rearward direction with a zero steer angle to better position the vehicle. For example, the vehicle may sense the distance of object 1 rearward of the vehicle and the distance of object 2 forward of the vehicle. The vehicle is then parked evenly spaced between the first object and the second object.

For a smoothed control strategy, duration $s_1$ and position $x_4$ are table lookups for the y-coordinate of the final position.

While certain embodiments of the present invention have been described in detail, those familiar with the art to which this invention relates will recognize various alternative designs and embodiments for practicing the invention as defined by the following claims.

What is claimed is:

1. A method of determining a vehicle path for autonomously parallel parking a vehicle in a space between a first object and a second object in response to an available parking distance between the first object and second object, the method comprising the steps of:
   remotely sensing a distance between the first object and the second object;
   determining whether the distance is sufficient to parallel park the vehicle between the first object and the second object based on a threshold;
   determining a first position to initiate a parallel parking maneuver;
   determining a second position within the available parking space corresponding to an end position of the vehicle path;
   determining a first arc shaped trajectory of travel between the first position and an intermediate position, and a second arc shaped trajectory of travel between the second position and the intermediate position, wherein the first arc shaped trajectory is complementary to the second arc shaped trajectory for forming a clothoid which provides a smoothed rearward steering maneuver between the first position to the second position; and
   controlling a steering actuator to follow the determined vehicle path;
   wherein the first arc shaped trajectory includes a first segment based on a circle arc having a first center point, and wherein the second arc shaped trajectory includes a first segment based on a circle arc having a second center point, wherein the first arc shaped trajectory further includes a second segment extending from the first segment of the first arc shaped trajectory to the intermediate position, wherein the second arc shaped trajectory further includes a second segment extending from the first segment of the second arc shaped trajectory to the intermediate position, and wherein the second segment of the first arc shaped trajectory and the second segment of the second arc shaped trajectory are clothoids.

2. The method of claim 1 wherein the first arc shaped trajectory further includes an initial segment extending from the first position to the first segment of the first arc shaped trajectory, the initial segment forming a clothoid.

3. The method of claim 1 wherein the second arc shaped trajectory further includes an ending segment extending from the second position to the first segment of the second arc shaped trajectory, the ending segment forming a clothoid.

4. The method of claim 1 wherein the second position is a final parking position within the parking space.

5. The method of claim 1 wherein the second position is an interim stopping position, wherein the vehicle transitions from a rearward steering maneuver to a forward steering maneuver at the interim stopping position, the forward steering maneuver uses a steering wheel angle of substantially zero to park the vehicle at a final parking position.

6. The method of claim 1 wherein the second position is an interim stopping position for completing a first cycle of a two cycle parallel parking maneuver, the method further comprising the step of performing a forward steering maneuver having a steering wheel angle not equal to zero for parking the vehicle at a final parking position.

7. The method of claim 6 wherein the rearward steering maneuver includes a plurality of steering cycles in a clockwise direction and a plurality of steering cycles in a counterclockwise direction.

8. The method of claim 1 wherein the steering wheel angle at the first position is initially equal to zero.

9. The method of claim 1 wherein the steering wheel angle at the intermediate position is equal to zero.

10. The method of claim 1 wherein the vehicle at the intermediate position is determined when a right front corner of the vehicle is at a minimal distance from a left rear corner of the second object.

11. The method of claim 6 wherein the forward steering maneuver of the two cycle parallel parking maneuver further includes determining a third arc shaped trajectory of travel between the second position and the final parking position.

12. The method of claim 6 wherein the forward steering maneuver is based on a constant steer angle resulting in a path of curvature having a constant radius between the second position and final parking position.

13. The method of claim 6 wherein the final parking position of the vehicle is between the first object and the second object.

14. An autonomous parking system for parallel parking a vehicle between a first object and a second object, the system comprising:
   a sensing device for detecting objects proximate to the driven vehicle, the sensing device providing signals configured for determining a space between the first object and the second object; and
   a controller receiving the signals identifying the space between the first object and the second object, the controller autonomously controlling steering of the vehicle for parallel parking the driven vehicle;
   wherein the controller determines a first arc shaped trajectory of travel between a first position and an intermediate position, the first arc shaped trajectory cooperatively formed from at least one clothoid and an arc circle, and wherein the controller determines a second arc shaped trajectory of travel between a second position and the intermediate position, the second arc shaped trajectory is cooperatively formed from at least one clothoid and an arc circle, wherein a clothoid of the first arc shaped trajectory cooperatively joins a clothoid of the second arc shaped trajectory at the intermediate position, wherein the first arc shaped trajectory is complementary to the second arc shaped trajectory at the intermediate position for forming a smoothed transition rearward steering maneuver from the first position to the second position, and wherein the controller utilizes the smoothed transition rearward steering maneuver for autonomously parallel parking the vehicle driven vehicle.

15. The autonomous parking system of claim 14 wherein the sensing device includes an ultrasonic-based sensing device.

16. The autonomous parking system of claim 14 wherein the sensing device includes a radar-based sensing device.

17. The autonomous parking system of claim 14 wherein the sensing device includes an image based sensing device.

18. The autonomous parking system of claim 14 further comprising an electric power steering device for autonomously generating steering torque to the steerable drivers.

* * * * *